United States Patent [19]
Morrow

[11] 3,765,235
[45] Oct. 16, 1973

[54] METHOD OF MEASURING SIDE SLAP OF A PROJECTILE IN GUN TUBE

[75] Inventor: Warren P. Morrow, Silver Spring, Md.

[73] Assignee: The United States of America as represented by the Secretary of the Army, Washington, D.C.

[22] Filed: Oct. 31, 1972

[21] Appl. No.: 302,454

[52] U.S. Cl. .................................................. 73/167
[51] Int. Cl. ............................................. G011 5/14
[58] Field of Search ....................... 73/167; 102/70.2

[56] References Cited
UNITED STATES PATENTS
2,517,133  8/1950  Porter .................................. 73/167
3,464,266  9/1969  Morrow ............................... 73/167

Primary Examiner—Donald O. Woodiel
Attorney—Harry M. Saragovitz et al.

[57] ABSTRACT

A method of monitoring side slap of a projectile during its in-bore travel. A coil and magnet assembly is mounted on the outer periphery of the projectile under observation. The assembly is insulated from the projectile and is adapted to generate an energy pulse upon leaving the gun tube. A magnetic flux field is established for the assembly which upon being disturbed produces a voltage change that is recordable upon suitable apparatus. Data has been taken for the time prior to the exciting of the projectile from the gun tube which illustrates the voltage signal received is a function of the side slap of the projectile within the tube. A gun bore wire take-up cone may be utilized in the device of the present invention to collect the wire that connects to the read-out instruments.

3 Claims, 3 Drawing Figures

PATENTED OCT 16 1973 3,765,235

METHOD OF MEASURING SIDE SLAP OF A PROJECTILE IN GUN TUBE

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of the Invention

This invention relates to in-bore projectile measurements and more particularly, to a method for measuring the side slap or balloting of a projectile in the bore of a gun prior to lanuch.

2. Description of the Prior Art

It is often desirable to collect ballistic data during movement of a projectile within a gun bore that relates to projectile acceleration, velocity, spin rate, vibration, etc. One such measurement which has been extremely difficult if not impossible to obtain in the past has been the side slap or balloting of the projectile within the gun tube prior to launch. The side slap, as its name clearly implies, consists of the small perturbations about the longitudinal axis of the projectile that occur as the projectile progresses through the length of the gun tube. Prior art devices to detect balloting have been few and far between and generally unsatisfactory in operation. To the author's best knowledge, a good balloting transducer is not currently available. For example piezoelectric devices are deemed unsuitable due to cross-axis sensitivity and high cross-axis signal. It would be, therefore, extremely advantageous if an electronic sensor were available to measure the balloting of an in-bore projectile.

It is therefore a primary object of the present invention to provide a method for measuring the side slap of a projectile in a gun bore.

Another object of the present invention is to provide a method of measuring the balloting of a projectile that is extremely sensitive to the small signals involved, is insensitive to shock and vibration, and is extremely reliable, economical to manufacture, and readily adaptable to existing in-bore measurement systems.

SUMMARY OF THE INVENTION

Briefly in accordance with the invention, a method of measuring the side slap of an in-bore projectile is provided which comprises the steps of mounting a magnet and coil assembly on the projectile, monitoring the output signal from the magnet coil assembly as the projectile progresses down the length of the gun tube, and analyzing the monitored output signal which provides data that relates to the clearance between the gun tube and the projectile at any point in time. The data also provides the velocity with which the projectile approaches the tube. A gun bore wire take-up cone can also be provided as an integral part of the apparatus in order to provide means for collecting the wire which leads to external recording apparatus as the projectile is moving down the gun tube. A second magnet and coil assembly can be mounted at a 90° angle with respect to the first assembly to provide more accurate and complete data.

BRIEF DESCRIPTION OF THE DRAWING

The specific nature of the invention as well as other objects, aspects, uses, and advantages thereof will clearly appear from the following description and the accompanying drawing, in which:

FIG. 1 is a fragmentary longitudinal sectional view of a gun bore illustrating the nose of a projectile connected to the apparatus which comprises the present invention;

FIG. 2a illustrates a sample graph of the output voltage signal detected utilizing the apparatus of FIG. 1; and FIG. 2b represents an amplified version of the signal of FIG. 2a.

DESCRIPTION OF THE PREFERRED EMBODIMENT

Figures 1, 2A, 2B:
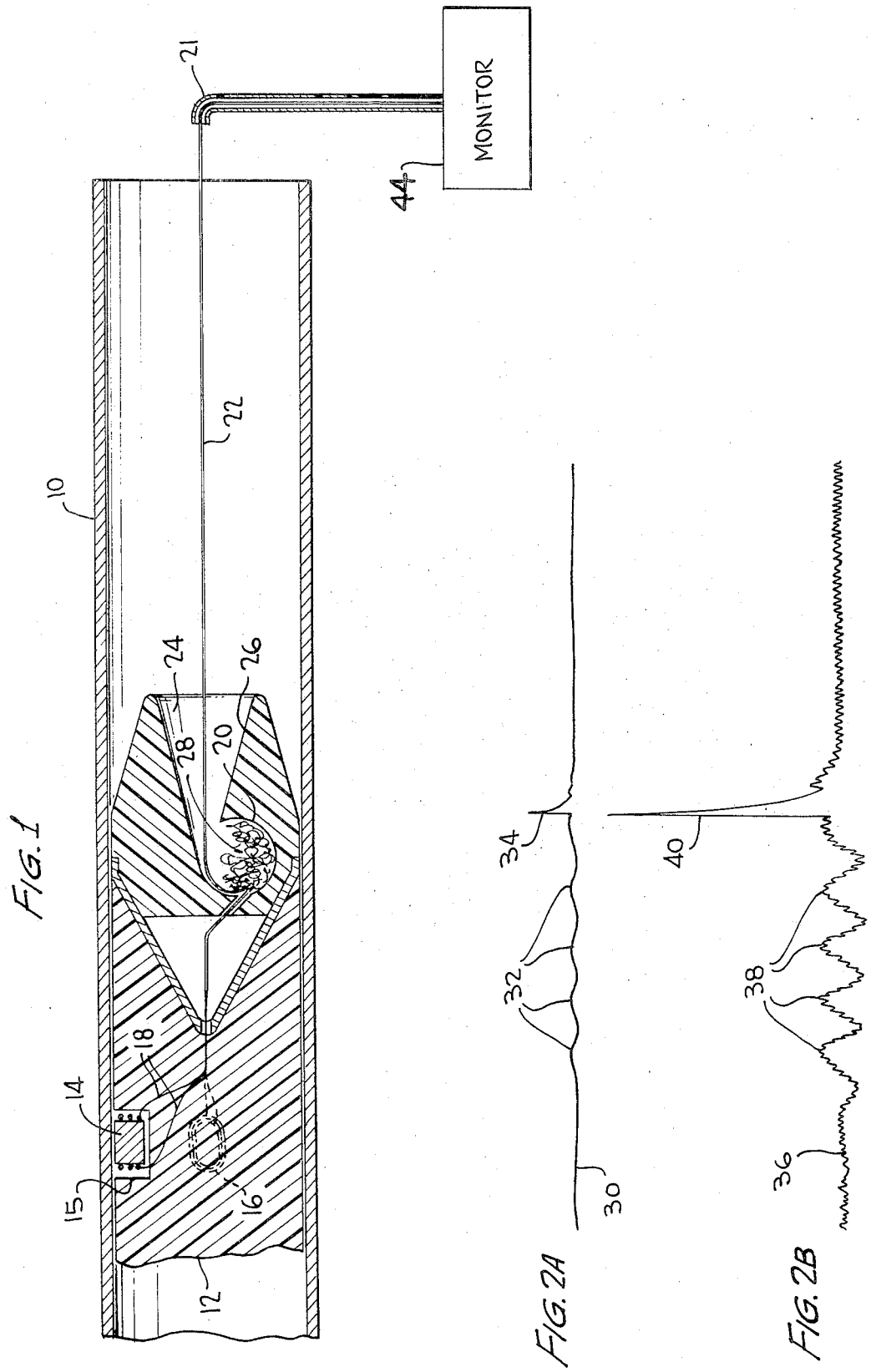

FIG. 1 represents in basic schematic form the principles that embody the present invention. At 10 is illustrated a gun barrel and a projectile 12 loaded within barrel 10. A lead wire 22 extends coaxially along barrel 10 from nose portion 24 and outwardly through the muzzle of barrel 10 for connection to suitable measuring instruments such as monitor 44, wire 22 being located within a support 21 to maintain the wire co axially with barrel 10. Wire 22 may be of the antenna type and is connected through nose portion 24 to a magnet and coil assembly 14 via lead lines 18. Magnet and coil assembly 14 is located on the periphery of projectile 12, preferably within a housing 15 shielded from the rest of the prejectile. The magnet and coil assembly 14 is adapted to generate an energy pulse upon leaving barrel 10, as taught in U. S. Pat. No. 3,417,700. The common use of such a device as explained in the foregoing patent is to provide a safe signal by which the launching of the projectile may be absolutely detected. The nature of the exit signal that is generated when projectile 12 leaves barrel 10 is illustrated in FIGS. 2A and 2B at 34 and 40, respectively. It is seen that the exit signal 34 comprises a noticeable voltage spike which indicates a change in the magnetic flux field of the magnet and coil assembly 14 as it leaves barrel 10. The magnitude of voltage spike 34 is dependent upon the number of magnet and coil assemblies utilized around the periphery of the projectile. I have discovered that prior to exiting barrel 10, a side slap signal is generated by magnet and coil assembly 14 as is illustrated in FIGS. 2A and 2B at 32 and 38, respectively. The balloting or difference in clearance between the side walls of barrel 10 and projectile 12 as the latter moves down barrel 10 was discovered to be a function of the voltage signal 32 generated just prior to launch.

In the preferred embodiment shown in FIG. 1, a gun bore wire take-up cone 26 is utilized which is described more fully in my prior U. S. Pat. No. 3,464,266. Briefly, the gun bore wire take-up cone is an improvement which virtually eliminates the tendency of wire 22 to break as it is collected at 28 in a hollowed out portion 20 of the nose 24. This method of connection preserves the electrical integrity of the system as an efficient monitoring device as the projectile progresses through the length of barrel 10. A second magnet and coil assembly 16 is preferably mounted at a 90 degree angle with respect to assembly 14 for providing balloting information in both the X and Y directions simultaneously.

It is seen that I have provided an effective method for measuring the side slap of a projectile in a gun tube that may be adopted by utilizing existing measuring equipment and telemetry methods well known in the art.

I claim as my invention:

1. A method for measuring side slap of a projectile while in the bore of a gun tube, comprising the steps of:
   a. mounting a first magnet and coil assembly on the periphery of said projectile;
   b. monitoring the output signal from said first magnet and coil assembly as said projectile progresses down the length of said gun tube; and
   c. analyzing said monitored output signal to provide data relating to the clearance between said gun tube and said projectile at any point in time plus the velocity with which said project approaches said tube.

2. The method of claim 1 wherein said step of monitoring is accomplished with the aid of a gun bore wire take-up cone.

3. The method of claim 1 further comprising the steps of monitoring a second magent and coul assembly on said projectile and monitoring and analyzing the signal obtained therfrom, said second assembly mounted at approximately a ninety degree angle with respect to said first assembly.

* * * * *